Aug. 29, 1950 — T. E. McFALL — 2,520,369
PISTON RING
Filed Nov. 12, 1946 — 3 Sheets-Sheet 1
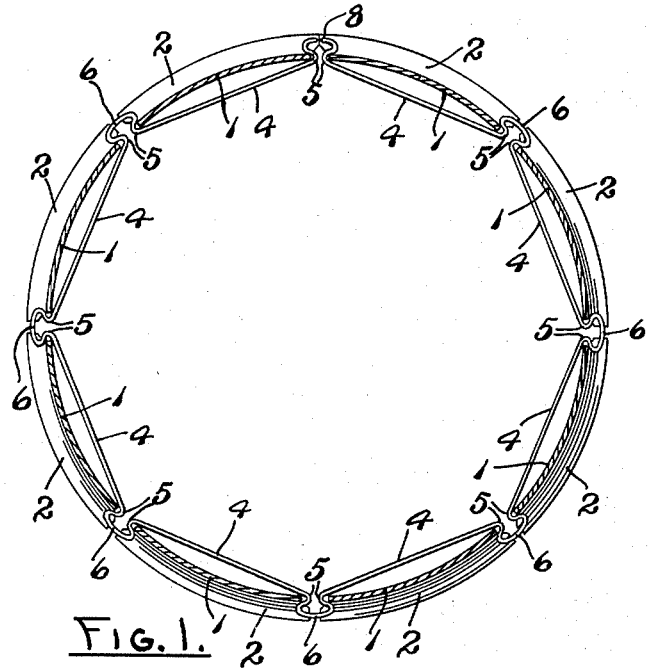
Fig. 1.
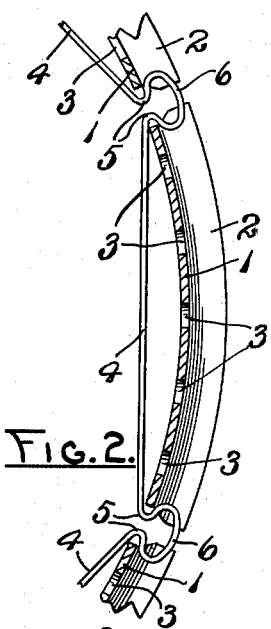
Fig. 2.
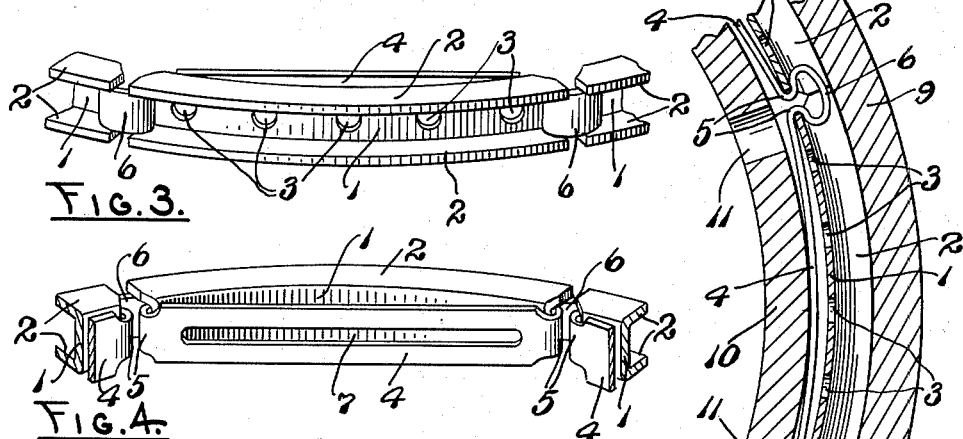
Fig. 3.
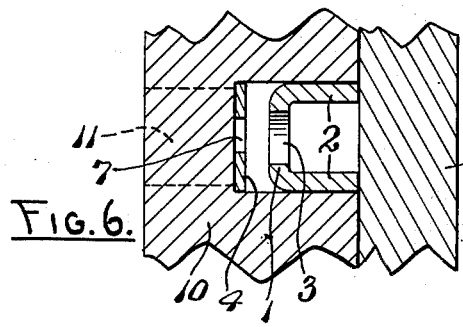
Fig. 4.
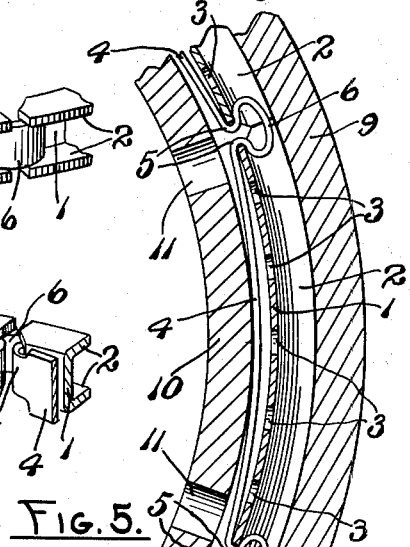
Fig. 5.
Fig. 6.
INVENTOR
THURLOW E. McFALL
BY Liverance and Van Antwerp
ATTORNEYS Aug. 29, 1950 T. E. McFALL 2,520,369
PISTON RING Filed Nov. 12, 1946 3 Sheets-Sheet 2

INVENTOR
THURLOW E. McFALL
BY Liverance and
Van Antwerp
ATTORNEYS

Aug. 29, 1950     T. E. McFALL     2,520,369
PISTON RING

Filed Nov. 12, 1946     3 Sheets-Sheet 3

INVENTOR
THURLOW E. McFALL
BY Liverance and
Van Antwerp
ATTORNEYS

Patented Aug. 29, 1950

2,520,369

UNITED STATES PATENT OFFICE 2,520,369

PISTON RING

Thurlow E. McFall, Sparta, Mich., assignor to Muskegon Piston Ring Company, Muskegon, Mich., a corporation of Michigan Application November 12, 1946, Serial No. 709,330

7 Claims. (Cl. 309—44)

This invention is directed to a novel structure of piston ring, and more particularly to a piston ring designed for use in the oil grooves of pistons, which is vented for the passage of oil and in which the ring is made of a plurality of sections located substantially end to end and of a generally arch shape, whereby, when the required number of the ring sections are used, a substantially circular ring is provided. The sections are mounted upon and held in substantially end to end relation to each other by a single length member of flat spring material which, when the ring is not in use and is out of a cylinder, holds the ring sections at their ends spaced a short distance apart, but such spring holding member may be altered with a resultant bringing of the ends of the ring sections more closely together, the spring opposite each ring section bearing against the bottom of the ring groove and being bent outward to provide a spring force which causes the sections, at their outer bearing surfaces, to engage against the walls of a cylinder with the pressure required for removing and conserving lubricating oil in an internal combustion engine.

One object and purpose of the present invention is to make the oil rings of steel or other equivalent material which may be formed and shaped into ring sections of a channel form in cross section, and to provide the spring member in its length with properly positioned outwardly formed loops which partially extend between the adjacent ends of the flanges of said channel ring sections and with which webs of said ring sections are securely interconnected and normally made inseparable from the continuous spring band. Such spring band is located at the inner sides of the ring sections, the flanges of which extend outwardly and at their outer edges are of an arc form, shaped in conformity with the cylindrical surface which they are to bear against. With a ring as thus constructed, the area of the flanges of the ring sections may be increased or diminished in accordance with the thickness or gauge of metal used without affecting the strength of the spring member which supplies the tension to the ring, and upon the strength of which the unit pressure of the bearing surfaces against the wall of the cylinder is dependent. Therefore, a piston ring is provided which has characteristics of long life without undue unit pressure against the cylinder wall, the making of the ring sections and of the spring to which they are connected are of separated and independent metallic parts permitting a design of each to conform to any specifications required in the matter of bearing area of the ring sections against the cylinder wall and the pressure with which they will be forced thereagainst.

A further object of the invention is to provide a piston ring which is economical to make, easily fabricated and assembled and readily installed for service.

An understanding of the invention may be had from the the following description, taken in connection with the accompanying drawings, in which:

Fig. 1 is a horizontal section through a piston ring made in accordance with my invention on a plane between the opposed bearing flanges thereof.

Fig. 2 is a fragmentary section similar to Fig. 1, enlarged.

Fig. 3 is a fragmentary edge view of the ring.

Fig. 4 is a fragmentary inner elevation of the ring.

Fig. 5 is a fragmentary horizontal section through a piston having the ring installed in a groove thereon and located within a cylinder.

Fig. 6 is a fragmentary enlarged vertical section through the piston and cylinder at an oil groove therein, the ring of my invention being shown in transverse vertical section.

Like reference characters refer to like parts in the different figures of the drawings.

Figure 9:
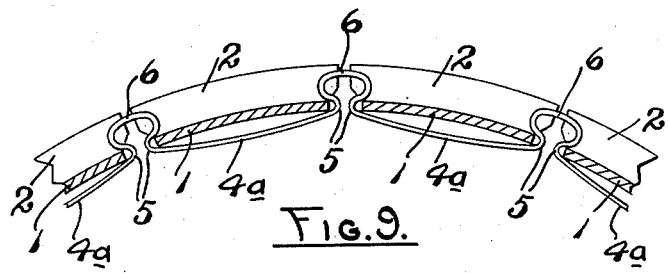
Fig. 9 is a view similar to Fig. 7 illustrating the ring made up of a greater number of ring sections, and, Fig. 10 is a similar view showing a somewhat modified form for greater flexibility of the spring ring member in rings having a lesser number of sections.

In the construction of the ring, a plurality of segments of channel form and of substantially identical construction are used, which are shaped in the arc of a circle so that when all of them are located in an end to end relation, they substantially complete a circle. Each of the segments made from flat metal has a vertical web 1 with outwardly extending upper and lower flanges 2. The web may have a number of oil passing openings 3, as shown in Fig. 3. The number of these sections which may be used in a ring is variable. For example, in Fig. 1, eight of said sections are shown but in Fig. 9, the lengths of the sections are reduced so that a greater number will be used in a completed ring.

The sections with adjacent ends spaced short distances apart are mounted and carried upon a spring member which is made from a single length of flat spring metal. Said spring member comprises a plurality of straight sections 4 located one at the inner side of the web 1 of each of the ring sections. The adjacent ends of the spring sections 4 are integrally connected by the return bends 5 at each end of each section 4 which is again bent back to form a loop 6 preferably of the shape which is best shown in Figs. 1, 2 and 5. Each of the spring sections 4 like-wise may be vented, for example by cutting an elongated slot 7 between its opposite edges (Fig. 4). The ends of the spring come together as at 8 in Fig. 1, the end portions of the spring being shaped to provide in effect a loop which is separated at its middle at 8.

The channel ring sections are disposed in succession around the spring member, one being mounted between the adjacent sides of successive loops 6 with the webs 1 of the ring sections seated in the U-shaped bends between the parts 5 and 6, with the side portions of the loops located between the adjacent sides of the upper and lower flanges 2 at the ends of the adjacent sections. The width of the metal at the loops 6 may be reduced so that the straight sections 4 may be of a width approximating that of the axial dimension of the ring sections and for said loops to extend between the flanges 2. Such loops thus located serve as strut supports and reinforcements for the flanges insuring against their being bent toward each other. The yielding of the spring material and its flexibility permits ready assembly with and connection of the ring sections 2 to the spring member. The outer portions of the loops 6 come slightly within the outer curved edges of the flanges 2.

A ring as thus constructed and when not in use outside of a cylinder will have a greater diameter than the interior diameter of the cylinder in which it is to be used. When it is placed within a cylinder, shown at 9 in Fig. 5, the spring is bent at each part 4 thereof by engagement against the bottom of the ring groove, the ends of the flanges 2 of the sections being brought closer together. Such deformation of the spring results in the creation of forces within the spring and the outer edges of the flanges 2 are pressed against the inner sides of the cylinder wall with a pressure in accordance with the resistance of the spring against the deformation. The sections 4 are bowed by engagement of the central portions against the bottom of the ring groove in the piston 10, and each ring section is pressed outwardly and the edges of the flanges 2 forced against the cylinder wall. Oil collected from the cylinder wall between the upper and lower flanges 2 can pass through the openings 3 and 7 and be drained to the interior of the piston through the passages 11.

Figure 7:
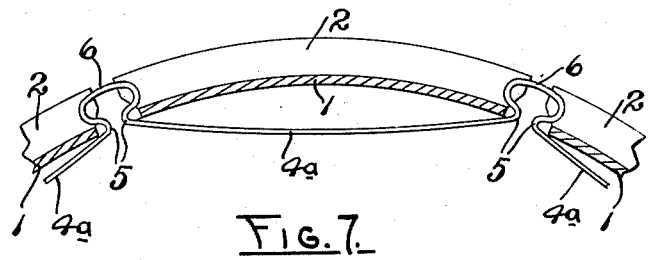
Fig. 7 is a view similar to Fig. 2 showing the spring formation slightly modified.

In Fig. 7 the structure is the same except the sections 4 of the spring member are initially inwardly bowed, as shown at 4a, resulting in a greater force generated in said parts 4a of the spring when installed in the groove of a piston and bowed in the other direction by contacting the bottom of the groove.

Figure 8:
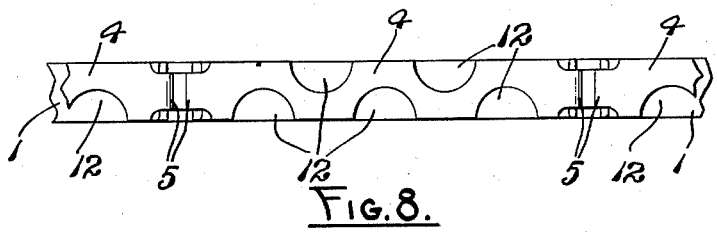
Fig. 8 is a view similar to Fig. 4 illustrating a modification in the construction of the spring member for oil venting or passage.

In Fig. 8, instead of oil venting slots 7 in the sections 4, upper and lower staggered notches 12 are made in the sections 4. It is to be understood that any provision of oil passing slots or notches in the sections 4 will result in lessening the spring tension, and therefore, that the force of the spring may be readily controlled by the thickness of the metal used, and the dimensions of oil venting openings therein.

Figure 10:
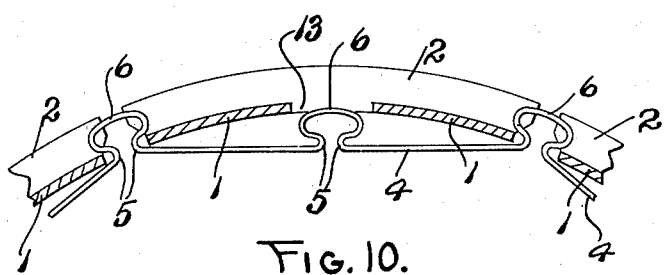
Figure 11:
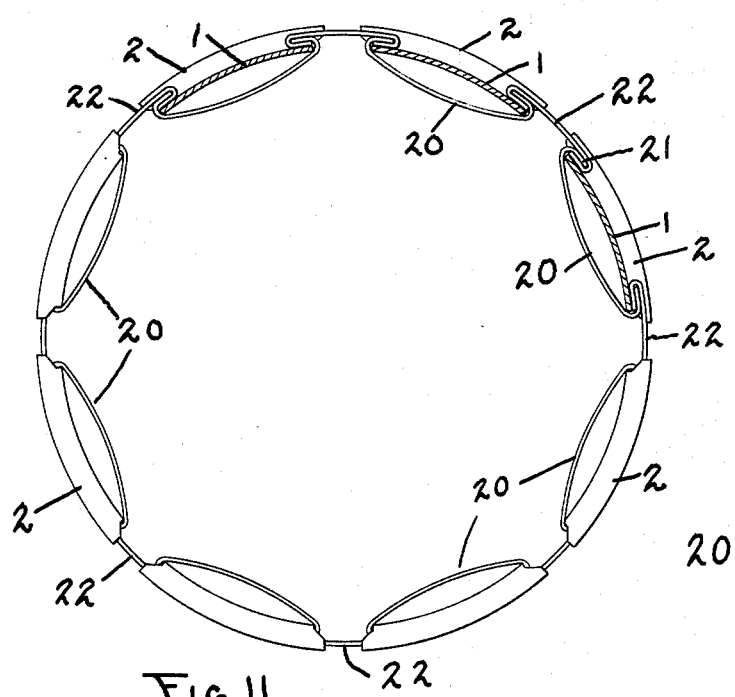
Fig. 11 is a plan view, partly in section, of a modified form of piston ring.
Figure 14:
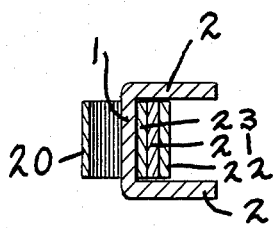
Fig. 14 is an enlarged cross section on the line 14—14 of Fig. 12.
Figure 12:
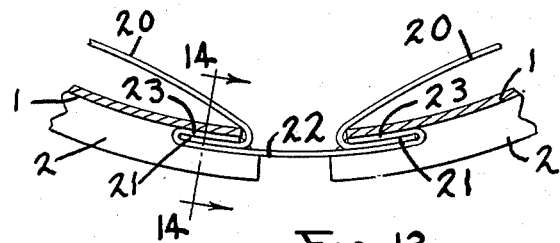
Fig. 12 is a fragmentary section of the same with the ring parts expanded.
Figure 13:
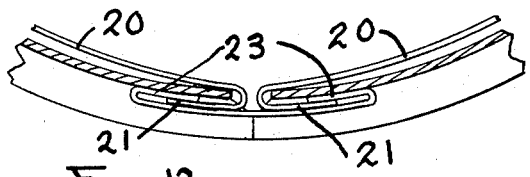
Fig. 13 shows the same parts as Fig. 12 with the ring members compressed as in the cylinder of an engine.

In Fig. 10 a modification is shown. The web 1 of each ring section is cut away midway between its ends to provide an opening 13. Midway between the ends of each spring section 4 a loop 6 with reverse U-shape bends 5 connecting it with the two parts of the section 4 is provided which is disposed inside its adjacent ring section opposite said opening. When the ring is installed, the loop 6 will be pressed outwardly and extend between the upper and lower flanges 2 supporting them at their middles. Likewise, the flexibility of the spring is increased.

The ring structure described is of a very practical useful character. The gauge of metal used for the channel-like ring sections may be selected without reference to the thickness or other characteristics of the spring metal. Therefore the bearing area of the flanges 2 against a cylinder wall is subject to variation without reference to spring material and any desired amount of pressure is obtainable. The spring is likewise not controlled as to its strength by the gauge of metal used for the ring sections which bear against the cylinder wall. This permits a wide latitude in the design of rings as to dimensions of materials used, tension of the ring when installed and unit pressures of the bearing surfaces against the cylinder wall.

As shown, and as a preferred structure, the spring is of a single length of material. However, an equivalent spring structure may be provided by making each of the polygonal sides of a single length of material with outward return bends at the ends to go around the ends of the webs of the ring sections, and clips substantially of the shapes of the loops hooked around the ends of said bends, whereby the loops provided are not integral with the polygonal sides of the spring but are provided partly at the ends of said polygonal sides and partly by the clips described. Therefore, the invention comprehends a spring structure which may be made of several parts and not necessarily of one single length of spring material.

The above described structure is shown in Figs. 11-14 in which 20 represents the polygonal sides each being return bent at each end at 21 forming sockets to receive the ends of the webs 1 of the ring sections. The clips 22 are return bent at each end at 23 to hook over the return bent ends 21 of the sides 20.

The invention is defined in the appended claims and is to be considered comprehensive of all forms of structure coming within their scope.

I claim:

1. A piston ring structure comprising, a spring member of generally polygonal form of flat thin material having at its corners outwardly extending loops integral therewith, the ends of said loops being connected with the sides of the polygonal shaped spring by U-bends open at their inner sides, and a plurality of ring members, one being located at the outside of each of said sides of the polygonal spring member and each generally in the form of an arc of a circle, each of which at each end is seated in one of said bends to retain the ring sections in assembled connection with the spring member.

2. A structure as defined in claim 1, having oil passage openings through said ring sections and the sides of the spring member.

3. A structure as defined in claim 1, each of the sides of said spring member being spaced from its adjacent ring member at the middle portions thereof, whereby when pressed in a piston ring groove, said sides of the spring member are outwardly bowed.

4. In a piston ring, a plurality of ring sections of generally channel form having vertical webs and spaced outwardly extending flanges, said webs being curved in the arc of a circle and having an opening therethrough and the edges of said flanges similarly curved, a spring member of flat metal of generally polygonal form having sides, one located at the inner side of the web of each ring section, and having loops at the ends of said sides of the ring member extending outwardly and passing between adjacent ends of the ring sections, said loops being open at their inner sides and contractable, and interengaging portions on the loops and ring sections for securing them against separation, each of said sides of the spring member having an additional outwardly extending loop located in opposition to the opening through the web of its associated ring member.

5. In a piston ring, a plurality of ring sections, each including a vertical web and a flange extending outwardly from the web, said web being curved in the arc of a circle, a spring member of flat material of a generally polygonal form having a plurality of sides located one within the web of each of said ring members, and means formed with said spring at each of its corners extending outwardly between the ends of adjacent ring members and with which said ring members are interlocked at said adjacent ends thereof, each of said polygonal sides of the spring member being inset from the web of the associated ring member a distance sufficient that when the ring is installed in the groove of a piston, said polygonal sides are bowed outwardly and tensioned, the tension force generated therein serving to press said ring members outwardly, each of said sides of the polygonal ring member at an intermediate portion in the length thereof having a flexible portion, whereby when said sides of the polygonal spring members are bowed outwardly by engagement against the bottom of a ring groove, the resultant force of the distorted sides of the spring member is modified.

6. A piston ring structure comprising a plurality of ring members of channel shape, each having an inner web and outwardly extending upper and lower flanges, the outer edges of said flanges being arc shaped, and a spring member made up of a plurality of separate sides in number equal to the number of ring sections, each of said spring side members being return bent at its ends and hooked over the respective ends of the web of a ring member, and means for connecting the adjacent ends of the respective spring side members.

7. The elements of claim 6 in which the means for connecting the ends of the spring side members comprises spring clips each having return bent ends hooked over and interlocking with the return bent ends of adjacent spring side members.

THURLOW E. McFALL.

REFERENCES CITED

The following references are of record in the file of this patent:

UNITED STATES PATENTS

| Number | Name | Date |
| --- | --- | --- |
| 1,918,707 | Mellor | July 18, 1933 |
| 2,319,098 | Zahodiakin | May 11, 1943 |
| 2,355,772 | Zahodiakin | Aug. 15, 1944 |
| 2,439,546 | McFall | Apr. 13, 1948 |